United States Patent
Chapman et al.

(10) Patent No.: US 11,108,475 B2
(45) Date of Patent: Aug. 31, 2021

(54) METHODS FOR OVER-THE-AIR TESTING OF BASE STATION RECEIVER SENSITIVITY

(71) Applicant: Telefonaktiebolaget LM Ericsson (publ), Stockholm (SE)

(72) Inventors: Thomas Chapman, Solna (SE); Asif Ali Khan, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 128 days.

(21) Appl. No.: 16/324,305
(22) PCT Filed: Aug. 11, 2017
(86) PCT No.: PCT/SE2017/050814
§ 371 (c)(1),
(2) Date: Feb. 8, 2019
(87) PCT Pub. No.: WO2018/030948
PCT Pub. Date: Feb. 15, 2018

(65) Prior Publication Data
US 2019/0173593 A1    Jun. 6, 2019

Related U.S. Application Data

(60) Provisional application No. 62/374,373, filed on Aug. 12, 2016.

(51) Int. Cl.
*H04B 17/29* (2015.01)
*H04B 7/06* (2006.01)
(Continued)

(52) U.S. Cl.
CPC ........... *H04B 17/29* (2015.01); *H04B 7/0617* (2013.01); *H04B 17/0085* (2013.01);
(Continued)

(58) Field of Classification Search
None
See application file for complete search history.

(56) References Cited

U.S. PATENT DOCUMENTS

| 9,379,806 B1 * | 6/2016 | Mandell | H04B 7/185 |
| 2005/0134505 A1 * | 6/2005 | McCleary | H01Q 25/007 |
| | | | 342/368 |

(Continued)

FOREIGN PATENT DOCUMENTS

EP    2512173 A1    10/2012

OTHER PUBLICATIONS

"3G PP TS 37.145-2 V0.3.0", 3rd Generation Partnership Project; Technical Specification Group Radio Access Network; Active Antenna System (AAS) Base Station (BS) conformance testing; Part 2: radiated conformance testing (Release 13), May 2016, pp. 1-45.

(Continued)

*Primary Examiner* — Chi H Pham
*Assistant Examiner* — Raul Rivas
(74) *Attorney, Agent, or Firm* — Murphy, Bilak & Homiller, PLLC

(57) ABSTRACT

An example method for testing a base station that supports multi-carrier transmission using multiple transceiver units comprises transmitting an interfering test signal in one or more transmit bands for the base station apparatus, using the multiple transceiver units and the antenna array, where the interfering test signal has a total EIRP at least approximately equal to the sum of the respective rated maximum EIRPs for each of the predetermined number of simultaneous carriers. This example method further comprises transmitting a desired test signal to the base station apparatus, in a receive band for the base station apparatus, using a test signal generator and a test antenna separate from the base station apparatus, and evaluating a receiver sensitivity for the base station apparatus, based on the desired test signal, while the interfering test signal is being transmitted.

23 Claims, 10 Drawing Sheets

(51) Int. Cl.
    *H04B 17/00* (2015.01)
    *H04B 17/10* (2015.01)
    *H04B 17/12* (2015.01)
    *H04B 17/336* (2015.01)

(52) U.S. Cl.
    CPC .......... *H04B 17/102* (2015.01); *H04B 17/12* (2015.01); *H04B 17/336* (2015.01)

(56) References Cited

U.S. PATENT DOCUMENTS

| | | | |
|---|---|---|---|
| 2005/0272377 A1 | 12/2005 | Oh et al. | |
| 2007/0087690 A1* | 4/2007 | Karabinis | H04B 7/18563 455/12.1 |
| 2009/0280748 A1* | 11/2009 | Shan | H04W 72/0406 455/67.11 |
| 2010/0273433 A1* | 10/2010 | Ozaki | H04B 17/29 455/67.11 |
| 2011/0159888 A1* | 6/2011 | Braiman | G01S 5/0278 455/456.1 |
| 2019/0036578 A1* | 1/2019 | Zirwas | H04B 7/0465 |

OTHER PUBLICATIONS

"3GPP TS 37.105 V13.1.0", 3rd Generation Partnership Project; Technical Specification Group Radio Access Network; Active Antenna System (AAS) Base Station (BS) transmission and reception (Release 13), Jun. 2016, pp. 1-100.

"3GPP TS 37.145 V0.2.0", 3rd Generation Partnership Project; Technical Specification Group Radio Access Network; Active Antenna System (AAS) Base Station (BS) conformance testing; Part 2: radiated conformance testing (Release 13), Apr. 2016, pp. 1-15.

* cited by examiner

METHODS FOR OVER-THE-AIR TESTING OF BASE STATION RECEIVER SENSITIVITY

TECHNICAL FIELD

The present disclosure is related to the testing of base station apparatuses, and is more particularly related to the testing of base station receiver sensitivity.

BACKGROUND

Active Antenna Systems (AAS) are an important part of the continued improvements to Long-Term Evolution (LTE) systems, and expected to be an essential part of the so-called fifth-generation (5G) wireless networks currently under development, e.g., by the $3^{rd}$-Generation Partnership Project (3GPP). AAS is a generic term that is often used in reference to radio base stations that incorporate a large number of separate transmitters that can be used for beamforming and/or Multiple-Input Multiple-Output (MIMO) transmission modes, and that integrate active transmitter components and radiating elements. There are several advantages to AAS implementation. One is that the integrated design reduces loss factors and can reduce overall power consumption. Secondly, form factor (i.e., size and weight) can be reduced. Related to this, there is some potential for site simplification. For LTE, AAS base stations can offer beamforming functionality, such as cell splitting, variable down-tilt and user-specific beamforming. 3GPP has specified several air interface enhancements to facilitate the exploitation of AAS base stations, including support for using up to 16 Channel-State-Information Reference Signal (CSI-RS) ports and CSI-RS beamforming.

For future networks, it is anticipated that 5G networks may operate in higher frequency bands than today. For example, 4 GHz is discussed for first systems in Japan. Further into the future, it is envisaged that the International Telecommunications Union (ITU) and/or regional regulators may allocate millimeter-wave spectrum, in in the range of 10-100 GHz. At higher frequencies, propagation losses are much greater than in today's bands. Furthermore, it is envisaged that transmissions will take place within larger bandwidths. Since the transmit power of both base stations and devices is limited by physical constraints and considerations such as Electromagnetic Field (EMF) limitations (i.e., the maximum allowed Electromagnetic Field strength), it is not possible to compensate the increased penetration losses and provide sufficient signal-to-interference-plus-noise ratios (SINRs) within wider bandwidths simply with increased transmit power. To achieve the link budgets required for high data rates, beamforming will be necessary. It is therefore expected that integrated active arrays will become a mainstream base station building practice in the 5G era.

A reference architecture for an AAS base station is shown in FIG. 1, which is taken from 3GPP TS 37.105, the technical specification for AAS Base Station (BS) transmission and reception, as promulgated by 3GPP. The BS shown in FIG. 1 comprises an antenna array, a radio distribution network (RDN), a transceiver unit array and a baseband processing unit (not shown).

The baseband processing performed by the baseband processing unit in the BS can be used to perform user-specific transmitter (TX) and receiver (RX) beamforming. Although a logical part of the base station, the baseband processing functionality may not be physically co-located with the other components.

The transceiver unit array contains active circuits that perform actions such as signal conditioning/processing, amplification and filtering in the transmit and receive paths. There may be different numbers of transmitters and receivers, and the transmitters and receivers may be implemented as single modules or separately. The Radio Distribution Network (RDN) distributes TX signals between the transceiver unit array and transmit antenna elements and RX signals between receive antenna elements and the transceiver unit array. The RDN may comprise splitting and combining of signals. The antenna array comprises a group of radiating elements (i.e., single antennas). The radiating elements may be TX-only, or RX-only, or for both RX and TX.

FIG. 2 illustrates the conventional approach to specifying BS radio-frequency (RF) requirements, where the RF requirements are established with reference to the antenna connectors, after which a radio distribution network (RDN) connects the transceivers to the antenna arrays. Such requirements are termed as conducted requirements, and allow conformance testing to be performed by connecting measurement and test equipment directly to the antenna connectors.

Radiated Transmit Power/Effective Isotropic Radiated Power (EIRP) with AAS BS

A feature commonly associated with AAS is a large number of radiating elements and transmitters. This enables the AAS to carry out advanced beamforming with high directivity beams. Unlike the passive antenna systems of conventional base stations, the AAS can dynamically and electronically control the shape and direction of beams. Beamforming is performed by applying amplitude and phase variations to the signals radiated from different antenna elements. The amplitude and phase variations may be applied at any stage in the architecture of FIG. 1. Typically, for very dynamic and/or user-specific beamforming, the amplitude and phase weights are set in the baseband.

A very common type of array, known as a uniform linear array, is shown in FIG. 3. The depicted array comprises a set of antenna elements arranged in one dimension with a uniform spacing d. It is possible, with appropriate precoding of the signals input to the antenna array, for the depicted uniform linear array to transmit beams at different angles with respect to the antenna plane, as depicted in FIG. 4. More complex types of array include 2D linear arrays, arrays with non-uniform antenna spacing in a single plane, and conformal arrays, in which antenna elements are arranged in three dimensions. All of these arrays allow for beamforming to be performed, with respect to transmit beams, receive beams, or both.

An AAS array may typically use methods such as those described above to direct beams in different directions at different times. A beam is directed towards a particular user or group of users when the user or group of users is scheduled. By directing energy using beamforming, received signal power at the scheduled user can be increased while interference towards other users is decreased.

An important parameter relating to antenna arrays when in use is the so-called Equivalent Isotropic Radiated Power (EIRP) of a given transmission. An EIRP metric is associated with a particular direction in relation to the base station. EIRP is the amount of power that would need to be input to an ideal, isotropic antenna in order to experience the same amount of field strength in the direction under consideration as is experienced from the actual antenna. If the actual antenna array has directivity, then the actual power provided to the antenna to produce a given EIRP in a particular direction can be far less than would need to be provided to an isotropic antenna, to achieve the same field in that direction.

A particularly important value of EIRP is the EIRP in the direction of the main lobe of the transmitted signal. FIG. 5 illustrates a simplified example of a beam EIRP profile with direction in one dimension.

Receiver Sensitivity for AAS BS

Receiver sensitivity is a well-known and important metric of receiver performance, and characterizes the ability of a receiver to detect a certain level of received signal that will enable it to operate effectively. It is commonly defined as the minimum magnitude of input signal required to produce a specified output signal having a specified signal-to-noise ratio and can be expressed as follows:

$$RX\ \text{Sensitivity} = (S/N)kT\ B(NF)$$

where:

S/N=Minimum signal-to-noise ratio needed to process/detect a signal k=Boltzmann's Constant=1.38×10-23 Joule/K T=Absolute temperature of the receiver input (Kelvin)= 290 K B=Receiver Bandwidth (Hz)

NF=Noise figure of the receiver.

It will be appreciated that while receiver sensitivity can be directly evaluated in terms of the minimum magnitude of input signal required to produce a specified output signal having a specified signal-to-noise ratio, as discussed above, receiver sensitivity can be indirectly evaluated with bit-error rate (BER) or block-error-rate (BLER) measurements, or with data throughput measurements.

Passive Intermodulation (PIM) Aspects

Passive Intermodulation (PIM) is the unwanted distortion or modulation of signals generated by the non-linear mixing of two or more frequencies in passive devices such as antennas, connectors, coaxial cables or in-building Distributed Antenna System (DAS). This mixing produces additional unwanted signals that can appear within or near frequency bands or channels of interest, creating interference and degradation in the quality of a wireless communication system. In particular, PIM can cause several intermodulation products that can fall in the receive band of the receiver and cause interference. (The terms "receive band" and "receiver band" are used interchangeably herein; each refers to the band of frequencies in which a given receiver or receiver configuration is designed to receive signals.) This degrades the quality of the wanted signal at the receiver and eventually causes reduction in the sensitivity of the receiver. This eventually results in an increased BER, for example, and unusable data or voice communications.

FIG. 6 illustrates an example of passive intermodulation. As seen in the figure, two strong frequency components f1 and f2 are in the TX band; these may be two carrier signals produced by a transmitter power amplifier, for example. These two frequency components f1 and f2 can generate odd-order intermodulation products in both active and passive components of the base station. While the intermodulation products generated in active components can often be addressed by filtering, those generated in passive components outside the transceiver, such as in the antenna connectors, coaxial cables, or antenna interfaces, may be difficult or impossible to address. Note that in the illustrated example, $3^{rd}$-order, $5^{th}$-order, and $7^{th}$-order products of f1 and f2 fall within the receive band. (The $3^{rd}$-order product in the illustrated receive band will be found at 2f1-f2, the $5^{th}$-order product at 3f1-2f2, and the $7^{th}$-order product at f4f1-3f2.) If one or more of these products are strong enough, relative to a desired signal in the receive band, the receiver sensitivity may be drastically affected.

3GPP has specified conformance procedures for conducted RX sensitivity requirements, which entail that the transmitter for a given transceiver should be switched on while testing the transceiver's receiver performance. This is done to ensure that the receiver can process the wanted signal (coming from another source) in the presence of distortion from the equipment's own transmitter (such as, for example leakage from the co-located electronics, or PIM from the antenna or RDN structure).

SUMMARY

As noted above, future base stations are increasingly likely to incorporate AAS. Some of these base stations may not provide access to antenna connectors, between the antenna arrays and the transceiver components, which means that over-the-air (OTA) testing of receiver sensitivity will take on increased importance. While current over-the-air testing approaches work fine for the case of single-carrier operation and allow reuse of the same principles applied in conducted tests, these current approaches have drawbacks when the BS supports multiple carriers and multi-band operation. The testing techniques detailed below address problems arising from the use of testing with OTA test signals in these situations. Embodiments detailed herein include methods of testing a base station apparatus comprising multiple transceiver units coupled to an antenna array, where the base station apparatus is configured to support multi-carrier transmission using the multiple transceiver units and wherein the base station apparatus is rated with a respective maximum equivalent isotropic radiated power (EIRP) for each of a predetermined number of simultaneous carriers. An example method comprises transmitting an interfering test signal in one or more transmit bands for the base station apparatus, using the multiple transceiver units and the antenna array, where the interfering test signal has a total EIRP at least approximately equal to the sum of the rated maximum EIRPs for the predetermined number of simultaneous carriers. This example method further comprises transmitting a desired test signal to the base station apparatus, in a receive band for the base station apparatus, using a test signal generator and a test antenna separate from the base station apparatus, and evaluating a receiver sensitivity for the base station apparatus, based on the desired test signal, while the interfering test signal is being transmitted.

Another example method comprises calculating a sum of the rated maximum EIRPs for the predetermined number of simultaneous carriers, and transmitting an interfering test signal on a single carrier frequency in a transmit band for the base station apparatus, using the multiple transceiver units and the antenna array, where the interfering test signal has a total EIRP at least approximately equal to the calculated sum. This example method further includes transmitting a desired test signal to the base station apparatus, in a receive band for the base station apparatus, using a test signal generator and a test antenna separate from the base station apparatus, and evaluating a receiver sensitivity for the base station apparatus, based on the desired test signal, while the interfering test signal is being transmitted.

Still another method comprises transmitting an interfering test signal comprising multiple carriers in a transmit band for the base station apparatus, using the multiple transceiver units and the antenna array, wherein each of the multiple carriers is transmitted at the respective rated maximum EIRP for the carrier, and transmitting a desired test signal to the base station apparatus, in a receive band for the base station apparatus, using a test signal generator and a test antenna separate from the base station apparatus. This method likewise further comprises evaluating a receiver sensitivity for the base station apparatus, based on the desired test signal, while the interfering test signal is being transmitted.

Variants of these example methods and other embodiments are detailed below.

DETAILED DESCRIPTION

Figure 1:
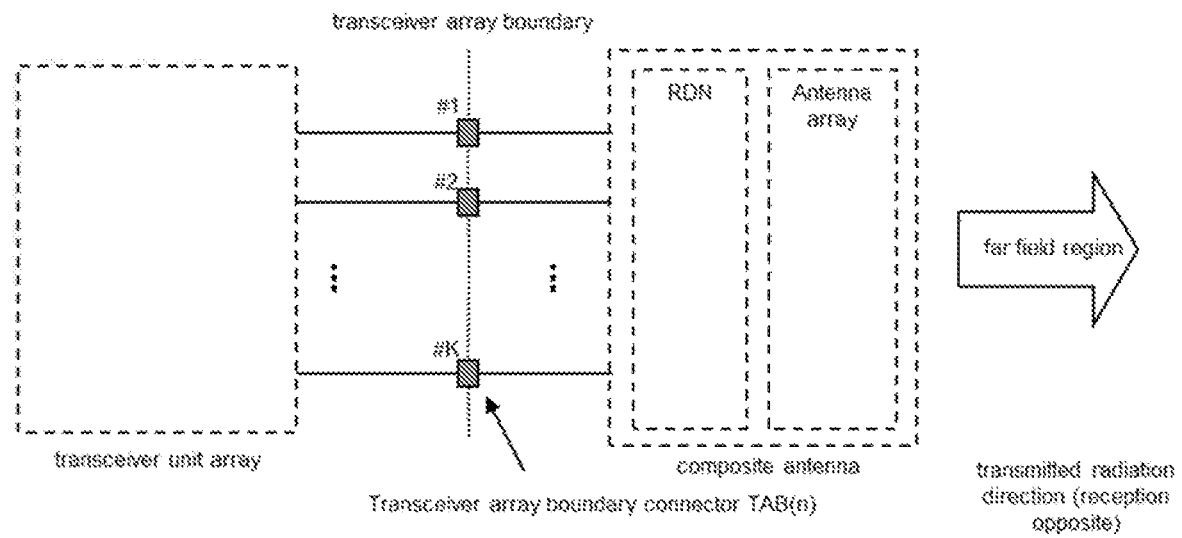
FIG. 1 illustrates a reference architecture for an AAS base station.

The conventional architecture of the AAS BS allows for the provision of antenna connectors between the transceiver unit array and the RDN. These are shown in FIG. 1 as the transceiver array boundary (TAB) connectors. However, in future generations, with higher frequencies of operations, an even closer integration of the antennas with the transceiver is expected. This means that the antennas will be fully integrated in the AAS BS, without any physical antenna connectors (i.e., without the transceiver array boundary (TAB) connectors shown in FIG. 1).

One of the implications of this is that the various radio-frequency (RF) requirements placed on the base station, such as receiver sensitivity requirements, transmitter emissions limits, etc., must be established with respect to the entire BS, including the antennas, as compared to the conventional approach where the RF requirements for the BS are established with respect to the antenna connectors.

Figure 2:
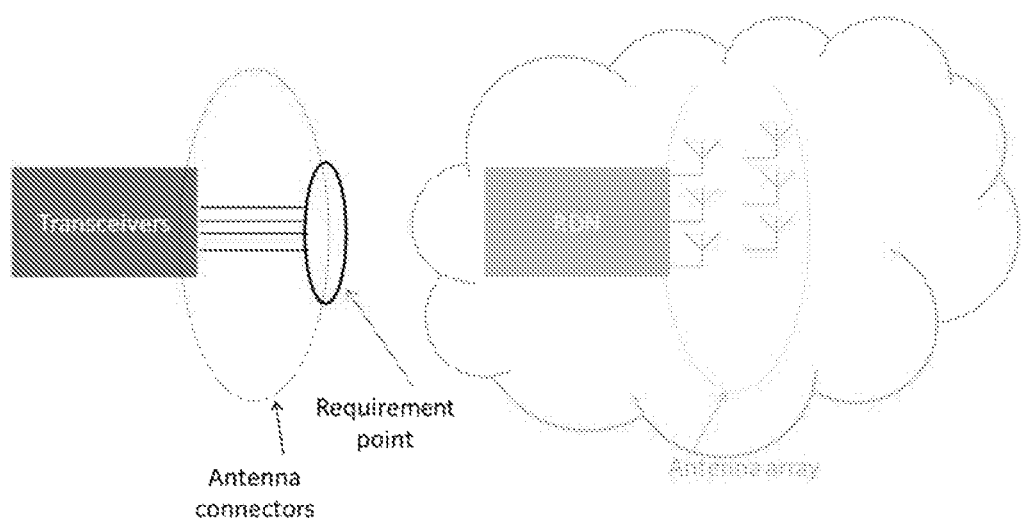
FIG. 2 illustrates a conventional approach to specifying base station radio-frequency (RF) requirements.
Figure 3:
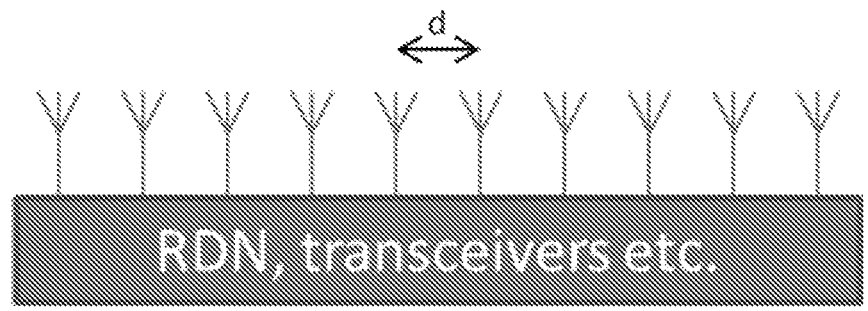
FIG. 3 illustrates an example uniform linear array.
Figure 4:
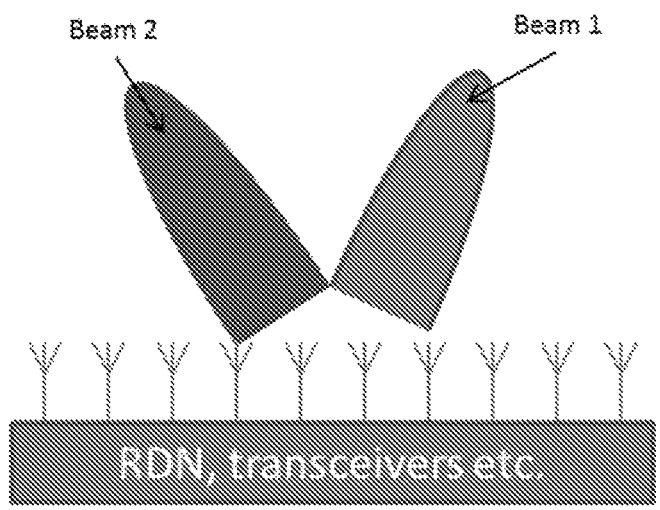
FIG. 4 illustrates beam-forming with an example uniform linear array.
Figure 5:
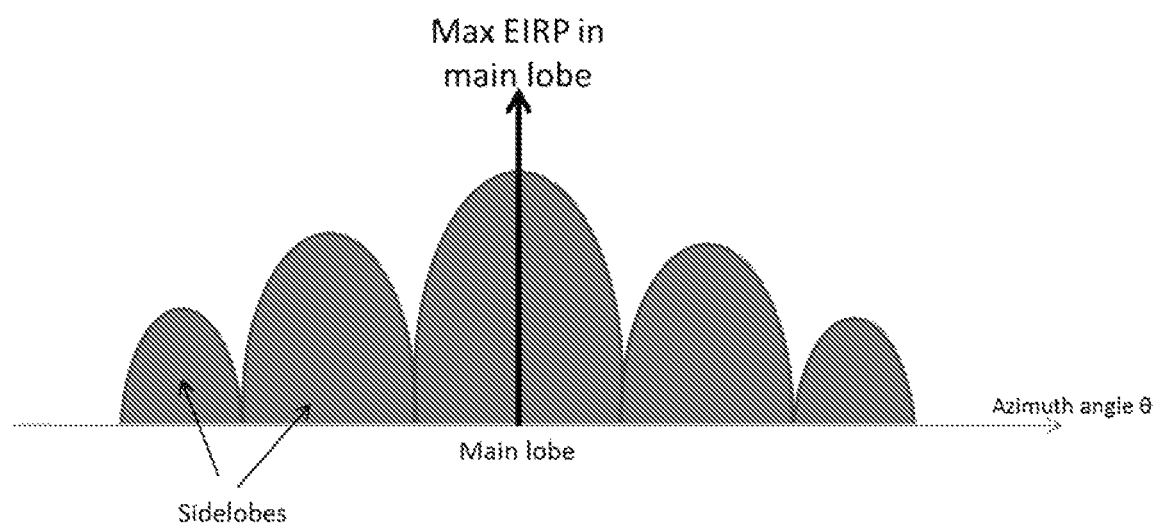
FIG. 5 illustrates a simplified example of a beam EIRP profile with direction in one dimension.
Figure 6:
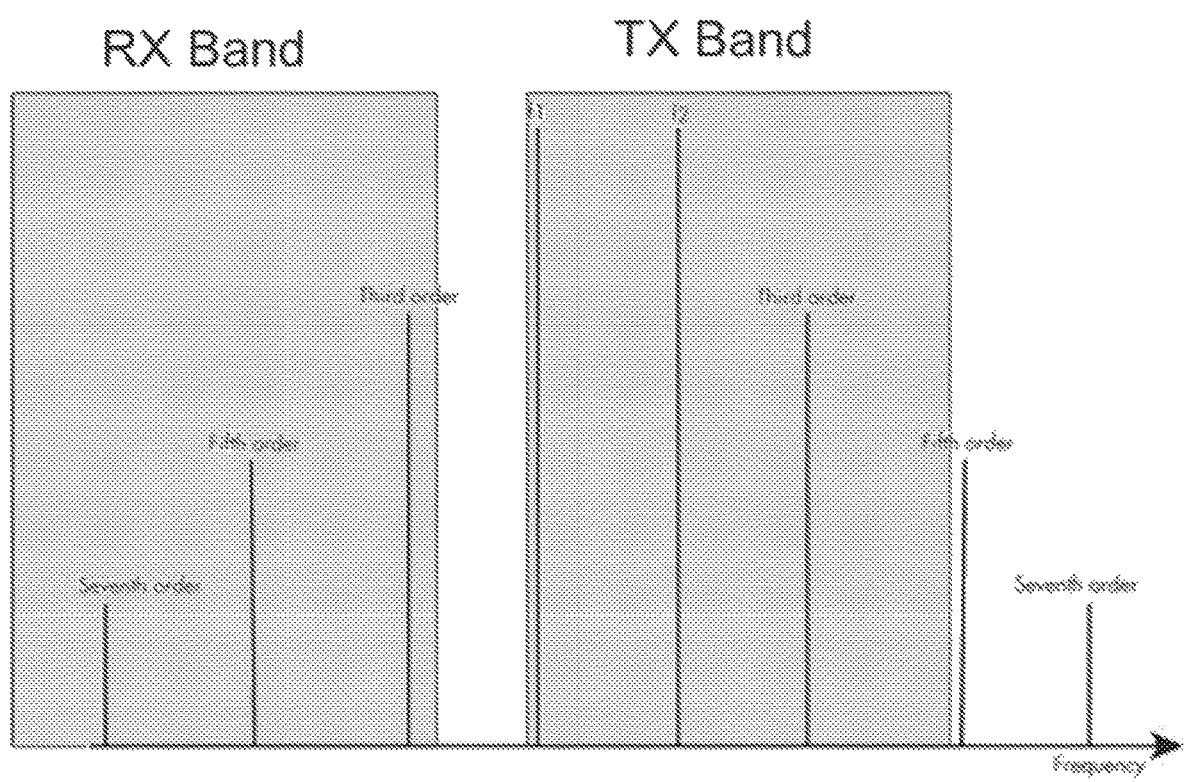
FIG. 6 illustrates an example of passive intermodulation.
Figure 7:
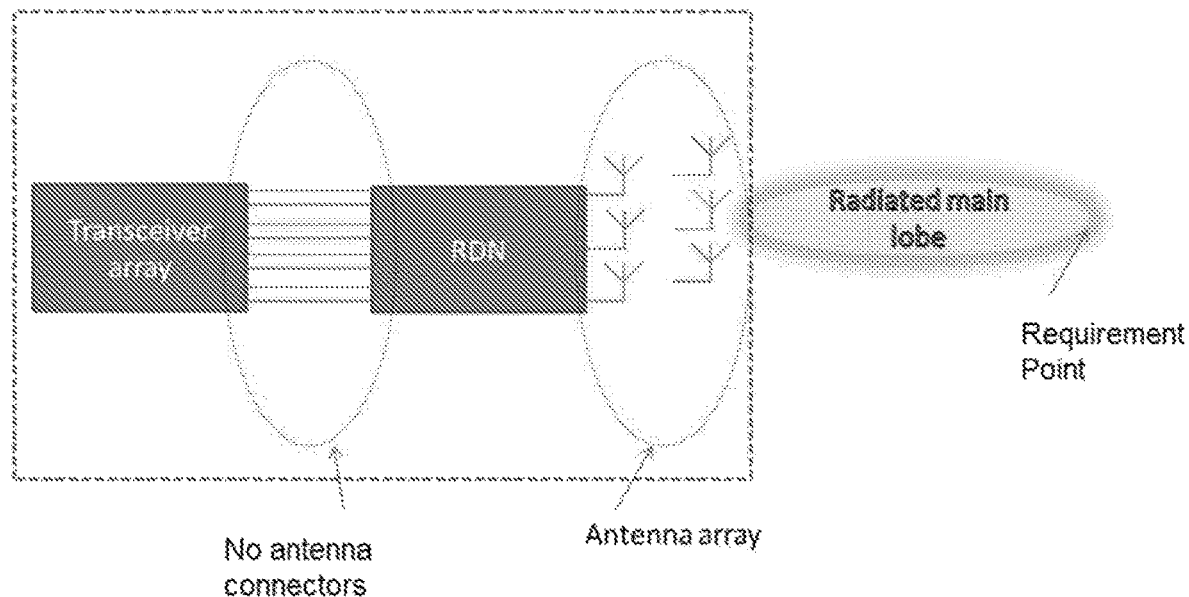
FIG. 7 shows an example architecture for AAS BS where antenna connectors may be absent.

FIG. 2 illustrates the conventional approach to specifying BS RF requirements, where the RF requirements are established with reference to the antenna connectors, after which a radio distribution network (RDN) connects the transceivers to the antenna arrays. Such requirements are termed as conducted requirements, and allow conformance testing to be performed by connecting measurement and test equipment directly to the antenna connectors. In contrast, FIG. 7 shows an example architecture for AAS BS where the antenna connectors may be absent. In this situation, the performance requirements for the BS need to be specified with reference to the radiated signals transmitted by the BS or transmitted to the BS.

Thus, the AAS BS architecture for next-generation equipment may require the specification of several over-the-air (OTA) or radiated performance requirements. The current 3GPP release for AAS BS specifies both conducted and radiated RX sensitivity requirements. An example illustration of sensitivity testing is provided in FIG. 8, where the wanted signal is transmitted from a distant source and at the receiving end, the TX is also switched on, which causes certain distortion at the RX. While the mechanisms for performing conformance testing for conducted RX sensitivity are known, methods for testing OTA RX sensitivity requirements for AAS BS are not yet defined. Note that this issue applies to AAS in general, whether included in a next-generation (e.g., "5G") wireless network or whether included as an improvement or extension to existing networks, such as the widely deployed Long-Term Evolution (LTE) wireless networks.

The techniques disclosed herein focus on defining the transmitted signal during the conformance testing of OTA receiver (RX) sensitivity for AAS BS. This is needed to ensure that the equipment fulfills the requirements (SINR, BER, or other metrics) defined to ensure the RX sensitivity performance of the equipment. These techniques may be applied to next generation equipment as well as to equipment compatible with currently existing communications standards.

Figure 8:
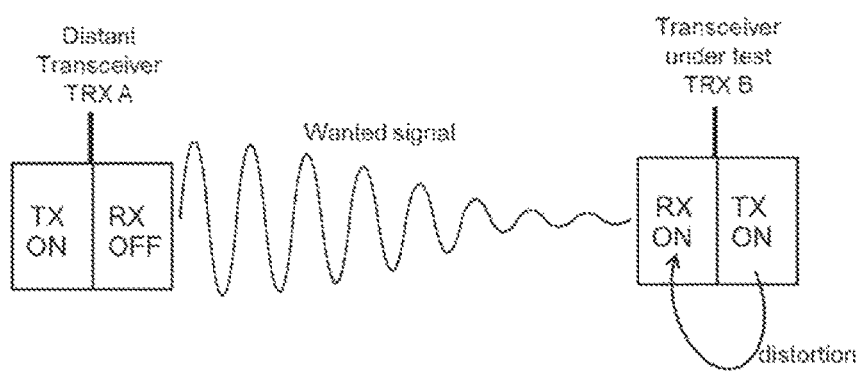
FIG. 8 is an example illustration of sensitivity testing.
Figure 9:
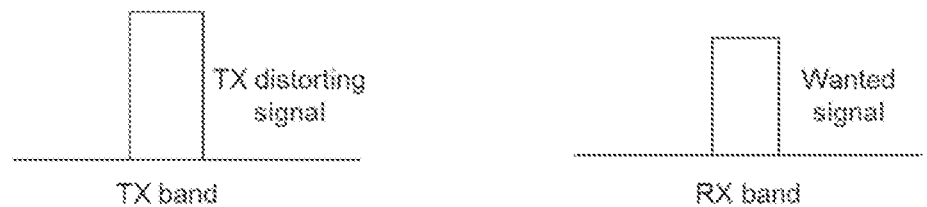
FIG. 9 shows the testing of conducted receiver (RX) sensitivity.

The existing (conducted) RX sensitivity conformance tests specified in 3GPP utilize a single carrier (or interfering signal) at the TX to cause distortion. These tests are repeated by placing the carrier at the bottom, middle and top portions of the declared RF bandwidth of the BS, in respective tests. The example illustration of FIG. 9 shows the testing of conducted RX sensitivity for transceiver (TRX) B (as illustrated in FIG. 8), for the case when the (potentially) interfering signal is placed on the middle of the declared RF bandwidth (BW) of the transmitter.

Under the above configuration, a wanted signal is transmitted with a specific measurement channel, and a measurement of the BER and throughput is performed to ensure that the requirements for reference sensitivity level are met. Additionally, for the case of multi-band transceivers (i.e., where the TRX is capable of operating in multiple bands), the test is performed per band and repeated for all supported bands.

It can be contemplated that a similar procedure as explained above for conducted RX sensitivity testing can be followed for the conformance testing of OTA RX sensitivity requirements. This means, however, that the interfering signal for TRX B (in the example above) needs to be transmitted over the air, and hence the EIRP associated with that transmission plays an important role and must be defined. If the same principle is followed as for the conformance testing of the conducted RX sensitivity requirement, this would mean that a certain carrier is selected with a certain beam-width and maximum EIRP is set for that carrier to cause distortion towards the receiver. While this approach works fine for the case of single-carrier operation and allows re-using the same principles as for the conducted tests, it has certain drawbacks when the BS supports multiple carriers and multi-band operation. Note that the discussion that follow will frequently refer to carriers—it should be understood that multiple carriers may be transmitted in a single band, or in multiple bands, or both. In 5G scenarios where advanced beamforming is used, a BS may include many distinct transmitter circuits, any or all of which may be capable of transmitting one or more beams at any of several carrier frequencies and/or in any of several supported bands.

One problem that arises in the AAS BS testing context is that selecting one carrier from the multiple supported carriers for a tested BS means that the maximum power allocated to the selected carrier would be relatively lower, as compared to only a single carrier scenario, where all of the base station's transceiver resources are used for a single-carrier transmission. This in turn means that the interfering signal strength will be lower, and the RX sensitivity will not be tested appropriately.

Figure 10:
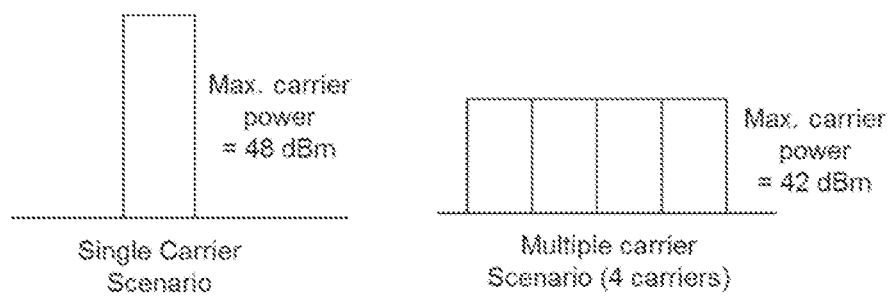
FIG. 10 illustrates power differences for single-carrier and multi-carrier scenarios.

Consider, for example, the scenario where a BS supports multi-carrier operation with four carriers. (Note that a BS might have many more than four transmitters, supporting the simultaneous transmission of many more than four carriers.) This means that the total power of the BS would generally be split across the 4 carriers. If one carrier is selected for testing and operated at its maximum declared power (in the multi-carrier context), the selected beam is allocated one-fourth of the total BS power and hence the power amplifiers (PAs) are operating at one-fourth capacity during the test. The power difference for this scenario is illustrated in FIG. 10, which shows the maximum TX power difference between single-carrier (SC) and multi-carrier (MC) scenarios.

This reduction in the maximum carrier power of the interfering signal means that the receiver will face less interference and will be able to process the wanted signal better than the case when the equipment was tested with the single carrier scenario, which is currently standardized in 3GPP. This leads to an under-tested scenario, where the performance of the receiver is not tested under conditions that approximate the worst-case scenario.

As discussed above, RX sensitivity requirements for a BS are tested with both the transmitter and the receiver of the BS under test turned on. The intention with turning the transmitter on while performing RX sensitivity testing is to generate a self-interfering signal that creates distortion at the receiver. The receiver's capability to receive and process the wanted signal is then judged under the influence of this distortion.

One focus of the techniques detailed herein is to provide methods to generate an interfering signal, at the transmitter, to provide the required distortion at the receiver when the RX sensitivity requirements are being tested over the air. The required distortion is achieved by transmitting a signal, during the RX sensitivity testing, where the transmitted signal has power levels that produce realistic levels of distortion, to approximate worst-case in-use scenarios. At the very least, the transmitted signal should have a power level (or power levels) that create conditions comparable to those that are present in conventional conducted sensitivity test scenarios. A TX signal with a lesser power would mean that the amount of distortion at the RX is reduced and hence the RX sensitivity requirements are not adequately tested or, in any event, are tested in a manner that is inconsistent with how conducted RX sensitivity tests are carried out.

Figure 11:
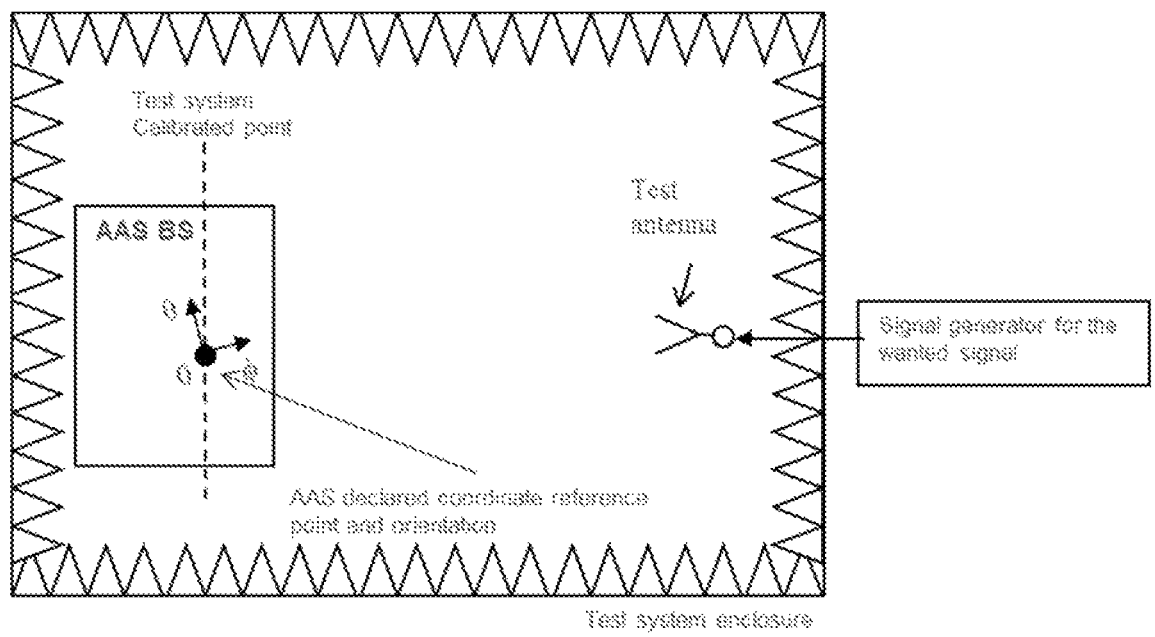
FIG. 11 shows an example calibration setup.

Several distinct approaches are disclosed, to provide various methods of defining the interfering signal. For each approach, the equipment is set-up in a mode to test OTA RX sensitivity. An example calibration setup is shown in FIG. 11, which shows the measurement set up for OTA sensitivity.

Approach 1: In a first approach, the TX (interfering) signal is defined as including only a single carrier, where all the PAs for the BS will be activated on one specific carrier. The transmit power (EIRP) for this signal will, however, be the total rated power of the BS, i.e., the sum of the EIRPs for multiple carriers. The EIRP resulting from the sum of respective maximum EIRP values for each supported carrier will ensure that the resulting signal creates worst-case distortion that would be equivalent to the conducted RX sensitivity test performed with a single carrier at the maximum declared power. This signal can then be generated/placed at the bottom, middle, and top of the declared RF bandwidth of the TX, and the RX sensitivity requirement can be tested according to the defined methods in 3GPP. Note that this can be extended to scenarios where the BS supports multiple bands, by successively placing the signal at corresponding points of the other TX bands, to generate additional test scenarios.

Approach 2: In a second approach, the TX (interfering) signal is defined as including multiple carriers, where each of the carriers is transmitted with the maximum supported EIRP for that carrier. This means that all the PAs will be operating at the declared maximum EIRP for the multi-carrier configuration. The receiver in this case will be exposed to the power/distortion resulting from all the carriers (or interfering signals on the TX side). This approach has the added benefit of generating passive intermodulation (PIM), for at least some combinations of bands and carrier frequencies, which will test the receiver's sensitivity to the various order intermodulation (IM) products in addition to the interfering signal.

In a variation of approach 2, a sub-set of multiple carriers can be selected at the TX, to generate the interfering signal, such that the combination of these carriers generates PIM. In an example implementation, this can be achieved by activating all transmitters on all supported bands, regardless of the supported band of the RX under test.

Approach 3: In a third approach, the TX (interfering) signal is defined as described above for either approach 1 or approach 2, but with an additional requirement on the total radiated power of the TX (interfering) signal or on the conducted power of the interfering signal. This means that regardless of whether approach 1 or approach 2 is used to configure the TX (interfering) signal, the signal would be tested either by means of conducted measurements or with requirements on the total radiated power to ensure that the level of the interfering signal is such that guarantees the desired distortion at the receiver. Such a signal with requirement on the TRP or conducted power would ensure that the power amplifiers (PAs) are operating at full power and the desired interfering test signal is generated.

Figure 12:
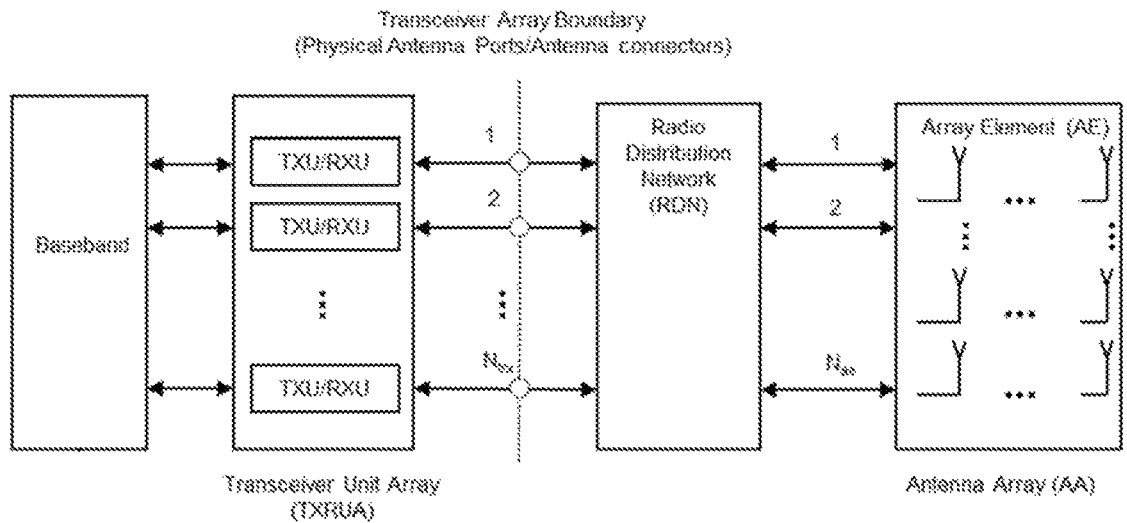
FIG. 12 shows an example of an AAS node, comprising a base station, radio distribution network, and antenna array.

An example of an AAS node with which the presently disclosed techniques may be carried out is provided in FIG. 12, which illustrates a reference architecture for an AAS base station (BS). The node comprises a baseband processing unit and a transceiver unit array (which in turn comprises transmitter units, or TXUs, and receiver units, or RXUs), an RDN, an antenna array and other hardware and software components responsible for management of the AAS BS and transportation of data to and from the AAS BS over backhaul. In this example, the RDN maps transmitters to TX antenna elements using a 1:1 mapping, and there are 32 transmitters and antenna elements. Other configurations of RDN and array are also possible. Also included in the AAS node is a scheduler algorithm. The scheduler algorithm collects typical parameters, such as data buffer size, user equipment (UE) reports of channel-quality information (CQI) and channel-state information (CSI), quality-of-service (QoS) information, etc.

An example measurement set-up for the OTA RX sensitivity requirement is provided in FIG. 11, where an AAS BS as shown in FIG. 12 is enclosed in a test system enclosure and is calibrated according to standardized test conditions, e.g., according to test conditions standardized by 3GPP. Additionally, a test antenna is connected to a signal generator that generates a desired test signal for the AAS BS. The desired test signal is then transmitted with a specific measurement channel to measure the Bit Error Rate (BER) and throughput at the AAS BS receiver to ensure that the requirements for reference sensitivity level (as specified by industry standard, customer requirements, etc.) are met. The transmitter(s) in the transceiver unit array (TRXUA) shown in FIG. 12 are switched on to cause a certain level of distortion at the receiver units (RXUs).

Figure 13:
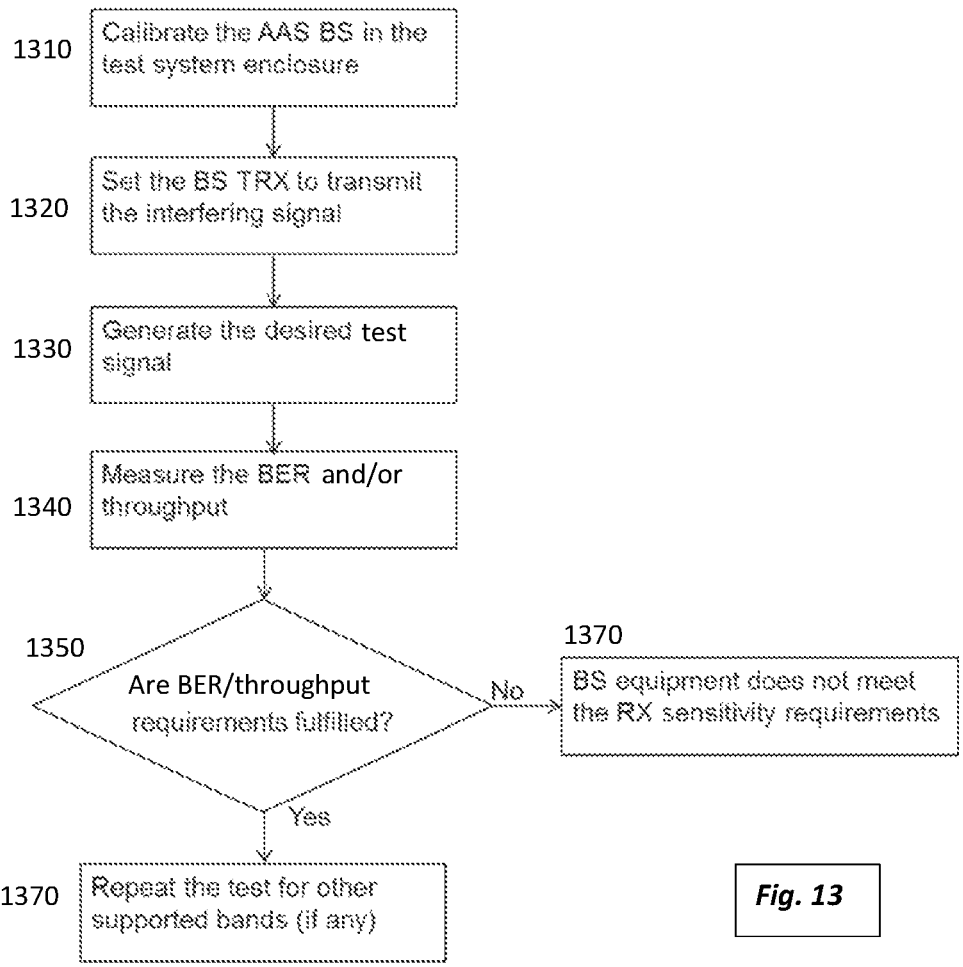
FIG. 13 is a process flow chart illustrating an example procedure for performing a measurement.

An example procedure to perform such a measurement is shown with a flow chart in FIG. 13. The illustrated method begins, as shown at block 1310, with a step of calibrating the AAS BS in the test system enclosure. This calibration step, which may not be present in every test carried out according to the techniques described herein, involves aligning various orientation parameters for the BS such as: aligning the manufacturer declared coordinate system orientation of the AAS BS with the test system and configuring the beam peak directions, etc.

As shown at block 1320, the BS transmitter (TRX) is then set to transmit the interfering signal, where the interfering signal is generated according to one of the techniques described herein, as discussed in further detail below. The desired "wanted" signal, i.e., the desired test signal in the receive band of interest, is generated, as shown at block 1330, and transmitted to the base station simultaneously with the interfering test signal. Note that herein, the terms "desired signal," "desired test signal," and "wanted signal" are all meant to refer to the test signal transmitted over the air to the base station under test, in a receive band for the base station under test, so that the base station's ability to receive and decode the test signal under various conditions of interference can be evaluated.

As shown at block 1340, the BER and/or throughput corresponding to the desired test signal is measured, according to the test requirements, thus evaluating the receiver sensitivity in the presence of the interfering test signal. As shown at block 1350, the measured BER and/or throughput are evaluated against the compliance requirements for the equipment. If they fail to meet the requirements, then the BS fails the test, as shown at block 1360. Otherwise, any additional tests may be performed, as shown at block 1370.

Generating the TX (Interfering) Signal

Approach 1: As briefly discussed above, in a first approach, the TX (interfering) signal is defined as including only a single carrier, where all the TX (i.e., the Power Amplifiers, or PAs) will be activated on a single specific carrier. Note that here and elsewhere in the present disclosure, the terms "TX signal" and "TX (interfering) signal," and "desired interfering signal" are synonymous with "interfering signal" and "interfering test signal." Since the BS is assumed to be capable of supporting multiple carriers, this means that the rated carrier power (or maximum EIRP) for any given carrier would be relatively lower than the case where the BS is tested in single-carrier (SC) mode, where all the power can be allocated to one carrier. In the case of multiple carriers, the power is split across multiple carriers. To achieve a level of interference similar to that in a single-carrier scenario, the radiated transmit power (EIRP) for the interfering signal is specified as the sum of the maximum EIRPs for all carriers. The EIRP resulting from the sum of maximum EIRP values for each supported carrier will ensure that the resulting signal creates a worst-case distortion that is equivalent to the conducted RX sensitivity test performed with a single carrier at the maximum declared power. This signal can then be generated at the bottom, middle, and top of the declared RF bandwidth of the TX, and the RX sensitivity requirement can be tested according to FIG. 13. An example illustration for a case with four carriers is shown in FIG. 14, with the respective individual maximum EIRP and the accumulated maximum EIRP levels.

Figure 14:
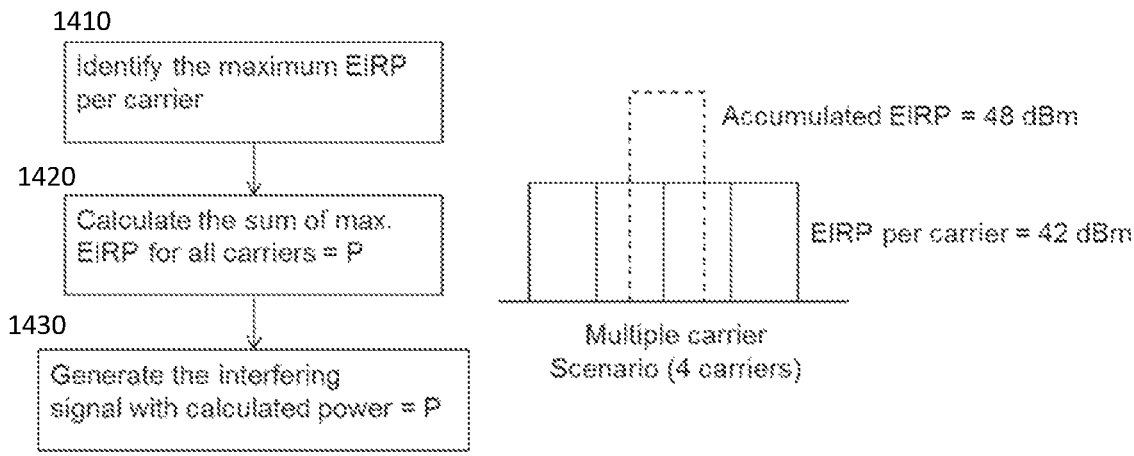
FIG. 14 illustrates an example involving four carriers.

FIG. 14 includes a process flow diagram illustrating an example procedure for generating the interfering signal according to this first approach. As shown at block 1410, the maximum EIRP for each carrier that may be simultaneously transmitted by the BS AAS is identified. Note that these carriers are not actually transmitted simultaneously during this test—what is meant here is that the carriers that may be simultaneously transmitted during normal operation. To avoid confusion, these carriers may be referred to as "simultaneous carriers" herein, to avoid any incorrect inference that these carriers are actually transmitted simultaneously as a part of the various testing techniques. These EIRPs may be the same or differ, in various embodiments. As shown at block 1420, the sum P of the maximum EIRP for all these carriers is calculated. As shown at block 1430, the interfering signal is generated with this calculated power P. Evaluation of the receiver sensitivity is carried out as discussed above, e.g., in connection with FIG. 13.

Figure 15:
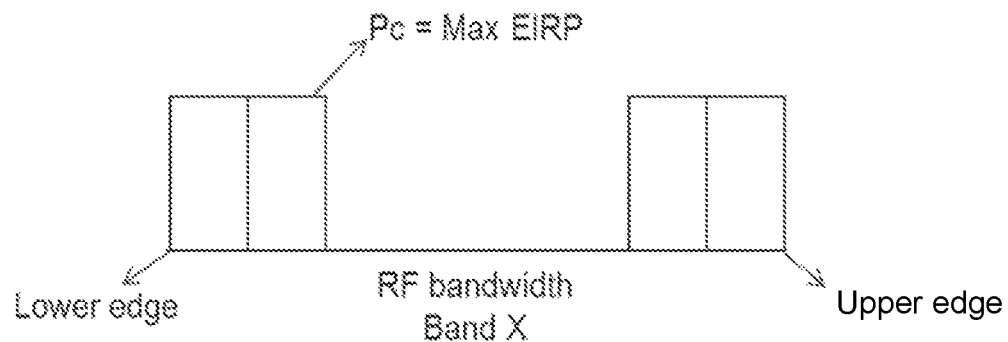
FIG. 15 illustrates the configuring of carriers in an interfering signal.

Approach 2: In a second approach, the TX (interfering) signal is defined as comprising multiple carriers, where each of the carriers is transmitted with the respective maximum supported EIRP for the carrier. The carriers may be generated, for example, such that first, a carrier is placed at the lower edge of the RF BW and then another carrier is placed at the upper edge of the RF bandwidth. This carrier placement is continued adjacent to the carriers at the upper and lower edge until the maximum number of carriers is reached. This carrier configuration, with four carriers, is shown in FIG. 15.

Activating each of these carriers with their maximum supported EIRPs means that that all the TRX/PAs will be operating at the declared maximum power for the multicarrier configuration. The receiver in this case will be exposed to the power/distortion resulting from all the carriers (or interfering signals on the TX side). This method has an added benefit of generating passive intermodulation (PIM) which will test the receiver's sensitivity to the various order IM products in addition to the desired interfering signal. These IM products tend to desensitize the BS RX and help testing its capability to withstand unwanted distortion.

It should be noted that the example carrier and power distribution described above for approach 2 is already used in the specification when testing for EIRP accuracy. However, here this power allocation is used when the BS is configured for RX sensitivity testing.

Figure 16:
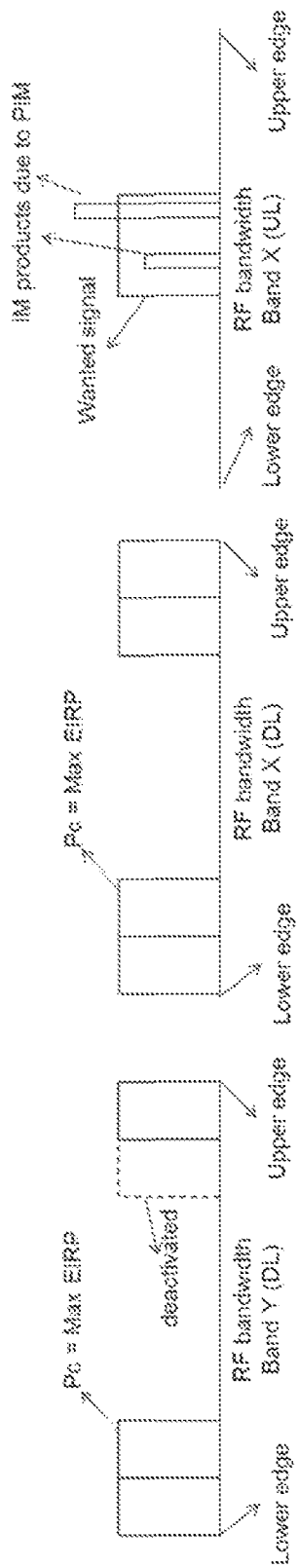
FIG. 16 illustrates a scenario in which multiple transmitters are activated to generate passive intermodulation.

In another variation of approach 2, a sub-set of multiple carriers can be selected at the TX to generate the interfering signal, where the selection is made so that the combination of these particular carriers generates PIM in the RX band or bands under test. In an example embodiment, this can be achieved by activating all transmitters on all supported bands regardless of the supported band of the RX under test. This scenario is illustrated in FIG. 16, where transmitters (DL) on both Band X and band Y are activated to generate PIM at the RX (UL) in Band X. It can additionally be seen that certain carriers in Band Y (DL) are deliberately deactivated, with the remaining carriers being selected to ensure PIM generation at Band X (UL).

Figure 17:
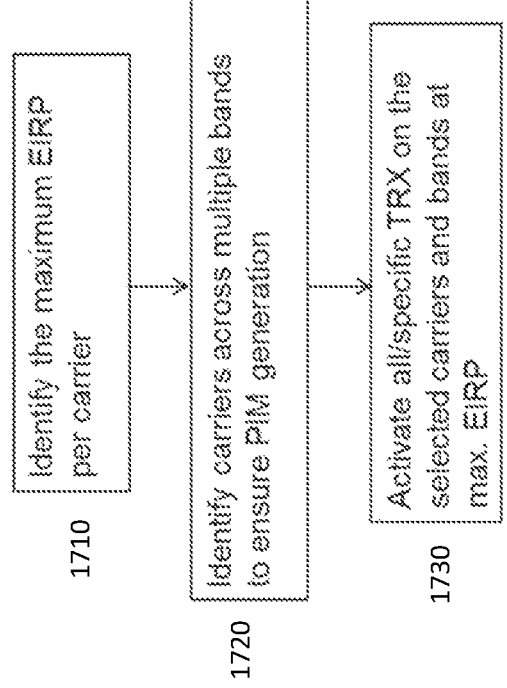
FIG. 17 is a process flow chart illustrating an example method.

FIG. 17 is a flow chart illustrating an example method for generating the interfering signal according to this approach 2. As shown at block 1710, the maximum EIRP for each carrier that may be simultaneously transmitted by the BS AAS (during normal operation) is identified. Again, these EIRPs may be the same or differ, in various embodiments. As shown at block 1720, carriers at specific frequencies across multiple bands are identified, to ensure PIM generation in the receiver test band or bands of interest. As shown at block 1730, the interfering signal is generated by activating transceivers on the selected carriers and bands, at the maximum EIRP for each carrier. Evaluation of the receiver sensitivity is carried out as discussed above, e.g., in connection with FIG. 13.

Approach 3: In a third embodiment, the TX signal can be defined as described in either approach 1 or approach 2 (i.e., either as a single carrier with EIRP that equals to the sum of maximum EIRPs of individual carriers or comprising multiple carriers each configured at its maximum EIRP) with an additional requirement on the total power of the TX (interfering) signal. This requirement on the total power can be specified in the form of a requirement on the total radiated power or as a requirement on the conducted power of the interfering signal. It should be noted that certain architectures might not allow for performing conducted measurements on the AAS BS and hence the requirement on the total radiated power is applicable in this case. This would mean that regardless of the approach 1 or approach 2 used to configure the TX (interfering signal), the signal is tested either by means of conducted measurements or with requirements on the total radiated power to ensure that the power level of the interfering signal is such that the desired distortion at the receiver is guaranteed. Such a signal with requirement on the total radiated power or conducted power ensures that the TRX/PAs are operating at full power and the desired interfering signal is generated.

Figure 18:
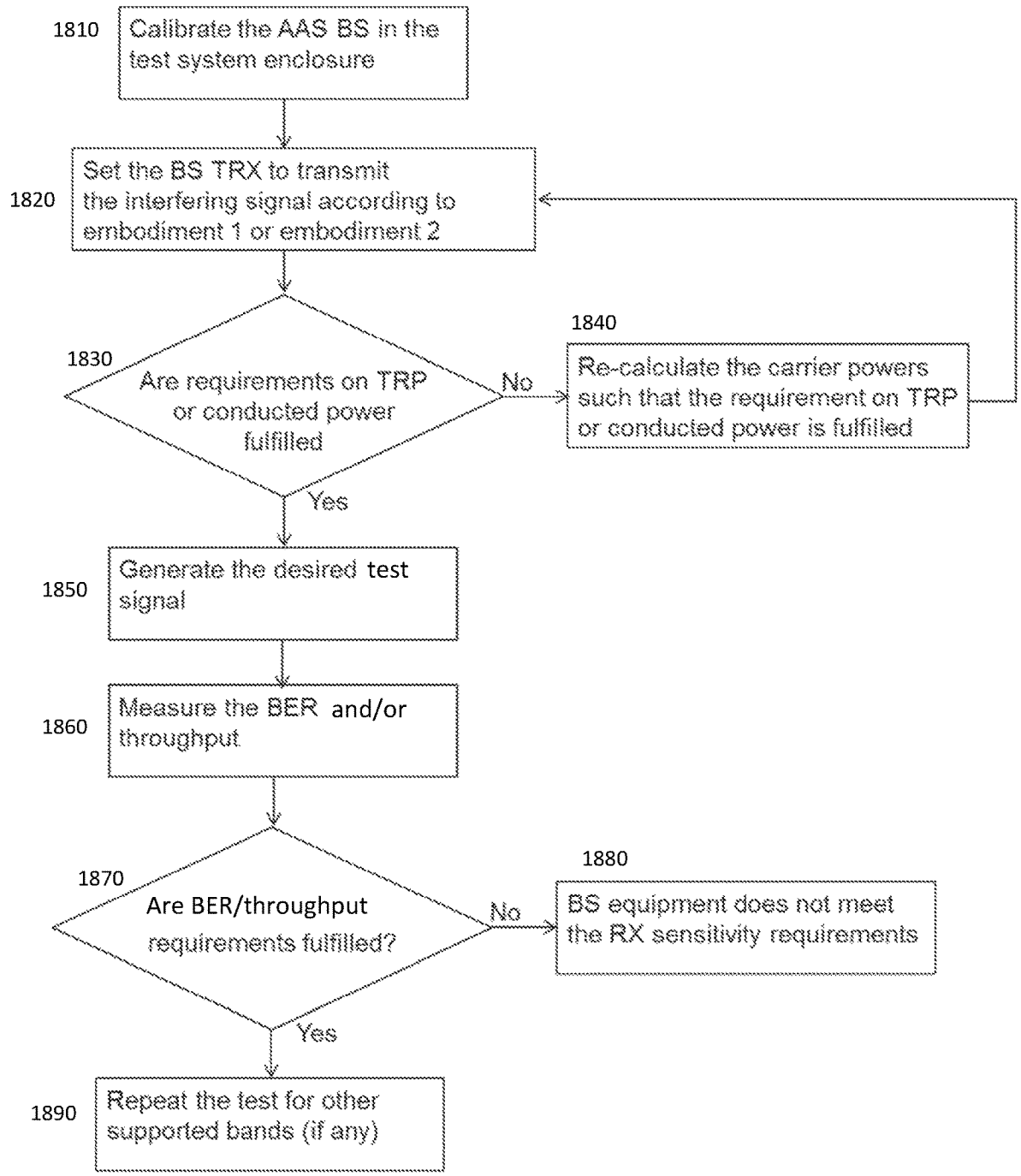
FIG. 18 is a process flow chart illustrating another example method.

However, this embodiment would add additional steps to the general procedure of testing the RX sensitivity that requires testing of the configured power before the OTA RX sensitivity requirements are tested. This is illustrated in FIG. 18, which shows an example OTA RX sensitivity testing procedure with requirements on total radiated power or conducted power.

As shown at block 1810, the illustrated method begins with a calibration step like that shown in FIG. 13. At block 1820, the BS transceiver (TRX) unit is set to transmit an interfering signal according to any of the approaches discussed above. As seen at block 1830, however, this interfering signal is evaluated to determine whether requirements on total radiated power (TRP) and/or conducted power are fulfilled. If not, as indicated at block 1840, the carrier powers are re-calculated or otherwise adjusted such that the requirements on TRP and/or conducted power are fulfilled.

When the requirements on TRP and/or conducted power are fulfilled, the desired test signal is generated, as shown at block 1850, and the BER and/or throughput for the received test signal are measured, as shown at block 1860. Failing and passing conditions for the test are shown at blocks 1870, 1880, and 1890.

The techniques described herein in provide a mechanism to define the interfering signals when testing the OTA RX sensitivity requirements. These techniques additionally provide certainty that the interfering signals generated would lead to a level of distortion that exists today in the conducted RX sensitivity testing, and can ensure that the RX sensitivity is tested adequately covering the worst case and hence ensuring enhanced performance for the BS RX equipment.

Following are example embodiments of the techniques described herein. It will be appreciated, however, that the scope of the techniques described herein is not limited to the specifically enumerated embodiments below.

(a). A method of testing a base station apparatus comprising multiple transceiver units coupled to an antenna array, wherein the base station apparatus is configured to support multi-carrier transmission using the multiple transceiver units and wherein the base station apparatus is rated with a maximum equivalent isotropic radiated power (EIRP) for each of a predetermined number of simultaneously transmitted carriers, the method comprising:
transmitting an interfering test signal in one or more transmit bands for the base station apparatus, using the multiple transceiver units and the antenna array, wherein the interfering test signal has a total EIRP at least approximately equal to the sum of the rated maximum EIRPs for the predetermined number of simultaneously transmitted carriers;
transmitting a desired test signal to the base station apparatus, in a receiver band for the base station apparatus, using a test signal generator and a test antenna separate from the base station apparatus; and
evaluating a receiver sensitivity for the base station apparatus, based on the desired test signal, while the interfering test signal is being transmitted.

(b). The method of example embodiment (a), wherein transmitting the interfering test signal comprises transmitting the interfering test signal on a single carrier frequency in a transmit band for the base station apparatus, using the multiple transceiver units and the antenna array, wherein the interfering test signal has a total EIRP at least approximately equal to the sum of the rated maximum EIRPs.

(c). The method of example embodiment (b), wherein the method comprises successively transmitting the interfering test signal at or near a low end of the transmit band, in a middle part of the transmit band, and at or near a high end of the transmit band, and evaluating receiver sensitivity for the base station apparatus under each interfering test signal condition.

(d). The method of example embodiment (a), wherein transmitting the interfering test signal comprises transmitting an interfering test signal comprising multiple carriers in a transmit band for the base station apparatus, using the multiple transceiver units and the antenna array, wherein each of the multiple carriers is transmitted at the rated maximum EIRP for the carrier.

(e). The method of example embodiment (d), wherein transmitting the interfering test signal comprises positioning a first one of the multiple carriers at or near a lower edge of the transmit band and positioning a second one of the multiple carriers at or near an upper edge of the transmit band, and positioning any remaining ones of the multiple carriers adjacent to the first and second ones of the multiple carriers.

(f). The method of example embodiment (d), wherein transmitting the interfering test signal comprises positioning at least two of the multiple carriers in one or more bands, so that at least one intermodulation product of the multiple carriers falls within the receiver band for the base station apparatus.

(g). The method of any of example embodiments (a)-(f), wherein transmitting the interfering test signal comprises generating the interfering test signal so as to conform to a predetermined total radiated power requirement and/or a predetermined conducted power requirement.

(h). The method of example embodiment (g), further comprising measuring the total radiated power of the transmitted interfering test signal, prior to evaluating the receiver sensitivity for the base station apparatus.

(i). A method of testing a base station apparatus comprising multiple transceiver units coupled to an antenna array, wherein the base station apparatus is configured to support multi-carrier transmission using the multiple transceiver units and wherein the base station apparatus is rated with a maximum equivalent isotropic radiated power (EIRP) for each of a predetermined number of simultaneously transmitted carriers, the method comprising:
    calculating a sum of the rated maximum EIRP for the predetermined number of simultaneously transmitted carriers;
    transmitting an interfering test signal on a single carrier frequency in a transmit band for the base station apparatus, using the multiple transceiver units and the antenna array, wherein the interfering test signal has a total EIRP at least approximately equal to the calculated sum;
    transmitting a desired test signal to the base station apparatus, in a receiver band for the base station apparatus, using a test signal generator and a test antenna separate from the base station apparatus; and
    evaluating a receiver sensitivity for the base station apparatus, based on the desired test signal, while the interfering test signal is being transmitted.

(j). The method of example embodiment (i), wherein the method comprises successively transmitting the interfering test signal at or near a low end of the transmit band, in a middle part of the transmit band, and at or near a high end of the transmit band, and evaluating receiver sensitivity for the base station apparatus under each interfering test signal condition.

(k). The method of example embodiment (i) or (j), wherein transmitting the interfering test signal comprises generating the interfering test signal so as to conform to a predetermined total radiated power requirement and/or a predetermined conducted power requirement.

(l) The method of example embodiment (i), further comprising measuring the total radiated power of the transmitted interfering test signal, prior to evaluating the receiver sensitivity for the base station apparatus.

(m). A method of testing a base station apparatus comprising multiple transceiver units coupled to an antenna array, wherein the base station apparatus is configured to support multi-carrier transmission using the multiple transceiver units and wherein the base station apparatus is rated with a maximum equivalent isotropic radiated power (EIRP) for each of a predetermined number of simultaneously transmitted carriers, the method comprising:
    transmitting an interfering test signal comprising multiple carriers in a transmit band for the base station apparatus, using the multiple transceiver units and the antenna array, wherein each of the multiple carriers is transmitted at the rated maximum EIRP for the carrier;
    transmitting a desired test signal to the base station apparatus, in a receiver band for the base station apparatus, using a test signal generator and a test antenna separate from the base station apparatus; and
    evaluating a receiver sensitivity for the base station apparatus, based on the desired test signal, while the interfering test signal is being transmitted.

(n). The method of example embodiment (m), wherein transmitting the interfering test signal comprises positioning a first one of the multiple carriers at or near a lower edge of the transmit band and positioning a second one of the multiple at or near an upper edge of the transmit band, and positioning any remaining ones of the multiple carriers adjacent to the first and second ones of the multiple carriers.

(o). The method of example embodiment (m), wherein transmitting the interfering test signal comprises positioning at least two of the multiple carriers so that at least one intermodulation product of the multiple carriers falls within the receiver band for the base station apparatus.

(p). The method of any of example embodiments (m)-(o), wherein transmitting the interfering test signal comprises generating the interfering test signal so as to conform to a predetermined total radiated power requirement and/or a predetermined conducted power requirement.

(q). The method of example embodiment (p), further comprising measuring the total radiated power of the transmitted interfering test signal, prior to evaluating the receiver sensitivity for the base station apparatus.

What is claimed is:

1. A method of testing a base station apparatus comprising multiple transceiver units coupled to an antenna array, wherein the base station apparatus is configured to support multi-carrier transmission using the multiple transceiver units and wherein the base station apparatus is rated with a respective maximum equivalent isotropic radiated power (EIRP) for each of a predetermined number of simultaneous carriers, the method comprising:
    transmitting an interfering test signal in one or more transmit bands for the base station apparatus, using the multiple transceiver units and the antenna array, wherein the interfering test signal has a total EIRP at least approximately equal to the sum of the rated maximum EIRPs for the predetermined number of simultaneous carriers;
    transmitting a desired test signal to the base station apparatus, in a receive band for the base station apparatus, using a test signal generator and a test antenna separate from the base station apparatus; and
    evaluating a receiver sensitivity for the base station apparatus, based on the desired test signal, while the interfering test signal is being transmitted.

2. The method of claim 1, wherein transmitting the interfering test signal comprises transmitting the interfering test signal on a single carrier frequency in a transmit band for the base station apparatus, using the multiple transceiver units and the antenna array.

3. The method of claim 2, wherein the method comprises successively transmitting the interfering test signal at or near a low end of the transmit band, in a middle part of the transmit band, and at or near a high end of the transmit band, and evaluating the receiver sensitivity for the base station apparatus for each successively transmitted interfering test signal.

4. The method of claim 1, wherein transmitting the interfering test signal comprises transmitting an interfering test signal comprising multiple carriers in a transmit band for the base station apparatus, using the multiple transceiver units and the antenna array, wherein each of the multiple carriers is transmitted at the respective rated maximum EIRP for the carrier.

5. The method of claim 4, wherein transmitting the interfering test signal comprises positioning a first one of the multiple carriers at or near a lower edge of the transmit band and positioning a second one of the multiple carriers at or near an upper edge of the transmit band, and positioning any remaining ones of the multiple carriers adjacent to the first and second ones of the multiple carriers.

6. The method of claim 4, wherein transmitting the interfering test signal comprises positioning at least two of the multiple carriers in one or more bands, so that at least one intermodulation product of the multiple carriers falls within the receive band for the base station apparatus.

7. The method of claim 1, wherein transmitting the interfering test signal comprises generating the interfering test signal so as to conform to a predetermined total radiated power requirement and/or a predetermined conducted power requirement.

8. The method of claim 7, further comprising measuring the total radiated power of the transmitted interfering test signal, prior to evaluating the receiver sensitivity for the base station apparatus.

9. The method of claim 1, wherein evaluating the receiver sensitivity comprises measuring a bit-error rate (BER) for a received signal corresponding to the desired test signal.

10. The method of claim 1, wherein evaluating the receiver sensitivity comprises determining a minimum received signal level for the desired test signal that results in a receiver output with a signal-to-noise-plus-interference ratio (SINR) of a predetermined level.

11. A method of testing a base station apparatus comprising multiple transceiver units coupled to an antenna array, wherein the base station apparatus is configured to support multi-carrier transmission using the multiple transceiver units and wherein the base station apparatus is rated with a respective maximum equivalent isotropic radiated power (EIRP) for each of a predetermined number of simultaneous carriers, the method comprising:
   calculating a sum of the rated maximum EIRPs for the predetermined number of simultaneous carriers;
   transmitting an interfering test signal on a single carrier frequency in a transmit band for the base station apparatus, using the multiple transceiver units and the antenna array, wherein the interfering test signal has a total EIRP at least approximately equal to the calculated sum;
   transmitting a desired test signal to the base station apparatus, in a receive band for the base station apparatus, using a test signal generator and a test antenna separate from the base station apparatus; and
   evaluating a receiver sensitivity for the base station apparatus, based on the desired test signal, while the interfering test signal is being transmitted.

12. The method of claim 11, wherein the method comprises successively transmitting the interfering test signal at or near a low end of the transmit band, in a middle part of the transmit band, and at or near a high end of the transmit band, and evaluating the receiver sensitivity for the base station apparatus for each successively transmitted interfering test signal.

13. The method of claim 11, wherein transmitting the interfering test signal comprises generating the interfering test signal so as to conform to a predetermined total radiated power requirement and/or a predetermined conducted power requirement.

14. The method of claim 13, further comprising measuring the total radiated power of the transmitted interfering test signal, prior to evaluating the receiver sensitivity for the base station apparatus.

15. The method of claim 11, wherein evaluating the receiver sensitivity comprises measuring a bit-error rate (BER) for a received signal corresponding to the desired test signal.

16. The method of claim 11, wherein evaluating the receiver sensitivity comprises determining a minimum received signal level for the desired test signal that results in a receiver output with a signal-to-noise-plus-interference ratio (SINR) of a predetermined level.

17. A method of testing a base station apparatus comprising multiple transceiver units coupled to an antenna array, wherein the base station apparatus is configured to support multi-carrier transmission using the multiple transceiver units and wherein the base station apparatus is rated with a respective maximum equivalent isotropic radiated power (EIRP) for each of a predetermined number of simultaneous carriers, the method comprising:
   transmitting an interfering test signal comprising multiple carriers in a transmit band for the base station apparatus, using the multiple transceiver units and the antenna array, wherein each of the multiple carriers is transmitted at the respective rated maximum EIRP for the carrier;
   transmitting a desired test signal to the base station apparatus, in a receive band for the base station apparatus, using a test signal generator and a test antenna separate from the base station apparatus; and
   evaluating a receiver sensitivity for the base station apparatus, based on the desired test signal, while the interfering test signal is being transmitted.

18. The method of claim 17, wherein transmitting the interfering test signal comprises positioning a first one of the multiple carriers at or near a lower edge of the transmit band and positioning a second one of the multiple carriers at or near an upper edge of the transmit band, and positioning any remaining ones of the multiple carriers adjacent to the first and second ones of the multiple carriers.

19. The method of claim 17, wherein transmitting the interfering test signal comprises positioning at least two of the multiple carriers in one or more bands so that at least one intermodulation product of the multiple carriers falls within the receive band for the base station apparatus.

20. The method of claim 17, wherein transmitting the interfering test signal comprises generating the interfering test signal so as to conform to a predetermined total radiated power requirement and/or a predetermined conducted power requirement.

21. The method of claim 20, further comprising measuring the total radiated power of the transmitted interfering test signal, prior to evaluating the receiver sensitivity for the base station apparatus.

22. The method of claim 17, wherein evaluating the receiver sensitivity comprises measuring a bit-error rate (BER) for a received signal corresponding to the desired test signal.

23. The method of claim 17, wherein evaluating the receiver sensitivity comprises determining a minimum received signal level for the desired test signal that results in a receiver output with a signal-to-noise-plus-interference ratio (SINR) of a predetermined level.

* * * * *